United States Patent [19]
Giuliano

[11] Patent Number: 5,265,520
[45] Date of Patent: Nov. 30, 1993

[54] AUTOMATIC MACHINE FOR DISPENSING BLACK COFFEE, WHITE COFFEE, AND THE LIKE

[75] Inventor: Mario Giuliano, Cuneo, Italy
[73] Assignee: Nuova Faema S.p.A., Milan, Italy
[21] Appl. No.: 761,366
[22] PCT Filed: Jan. 22, 1990
[86] PCT No.: PCT/EP90/00122
  § 371 Date: Aug. 23, 1991
  § 102(e) Date: Aug. 23, 1991
[87] PCT Pub. No.: WO91/00041
  PCT Pub. Date: Jan. 10, 1991

[30] Foreign Application Priority Data
  Jul. 5, 1989 [IT] Italy .................. 21101 A/89

[51] Int. Cl.$^5$ ............................................. A47J 31/40
[52] U.S. Cl. ................................ 99/323.1; 99/293;
  141/100; 222/129.1; 261/DIG. 76; 366/177
[58] Field of Search ................ 99/275, 290, 293, 294,
  99/323.1; 141/100, 104; 222/129.1, 132;
  261/DIG. 16, DIG. 76; 366/177

[56] References Cited

U.S. PATENT DOCUMENTS

| | | | |
|---|---|---|---|
| 1,800,368 | 4/1931 | Tomlinson | 99/290 |
| 4,245,680 | 1/1981 | Greenfield, Jr. et al. | 222/132 |
| 4,800,805 | 1/1989 | Mahlich et al. | 99/323.1 |
| 4,852,474 | 8/1989 | Mahlich et al. | 261/DIG. 76 |
| 4,945,824 | 8/1990 | Borgmann | 261/DIG. 76 |

FOREIGN PATENT DOCUMENTS

| | | | |
|---|---|---|---|
| 195750 | 9/1986 | European Pat. Off. | |
| 243326 | 10/1987 | European Pat. Off. | 99/293 |
| 251124 | 1/1988 | European Pat. Off. | |
| 326929 | 8/1989 | European Pat. Off. | |
| 344859 | 12/1989 | European Pat. Off. | |
| 7110 | of 1912 | United Kingdom | 99/290 |
| 828529 | 2/1960 | United Kingdom | 141/100 |

Primary Examiner—Harvey C. Hornsby
Assistant Examiner—Mark Spisich
Attorney, Agent, or Firm—Notaro & Michalos

[57] ABSTRACT

A machine for dispensing black coffee and white coffee of the cappuccino type, comprises a single housing containing both a coffee dispenser and a steam generator. A milk dispensing device having an emulsifier is connected in cantilever fashion to the housing. The milk dispensing device is connected to the steam generator, to a supply of milk and to an air inlet for producing either emulsified or simply pre-heated milk. A spout for the coffee dispenser is positioned immediately adjacent a spout for the milk dispenser and both are above a deck or platform for supporting a cup which can receive coffee with emulsified milk, coffee with pre-heated milk and coffee alone.

7 Claims, 3 Drawing Sheets

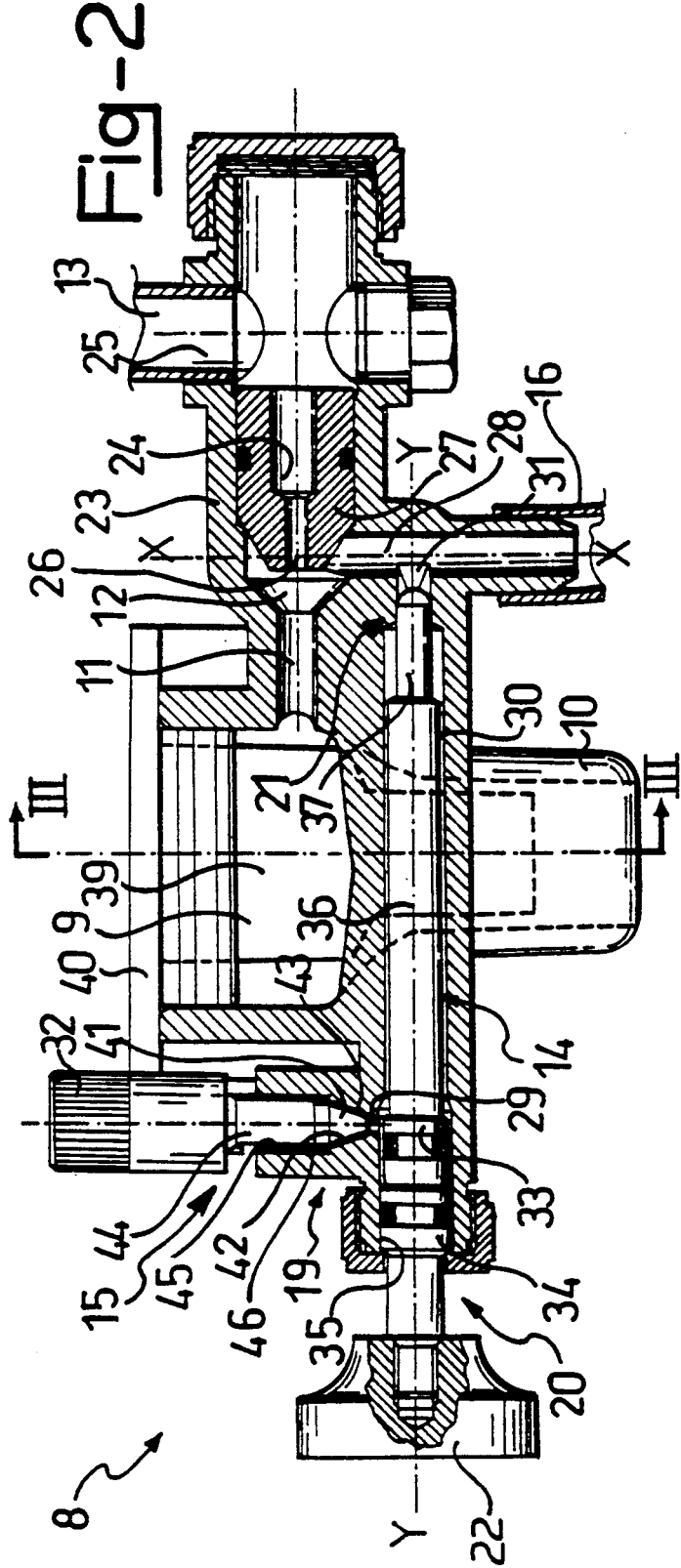

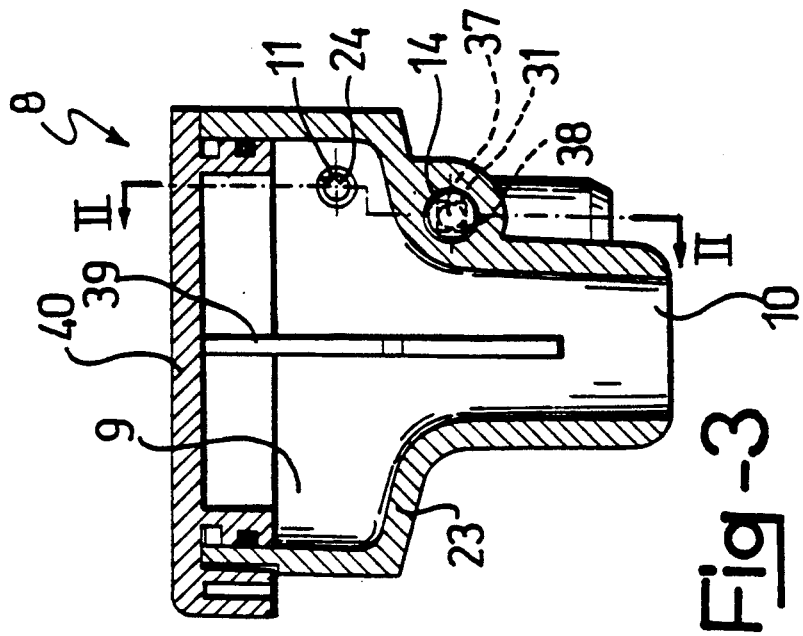
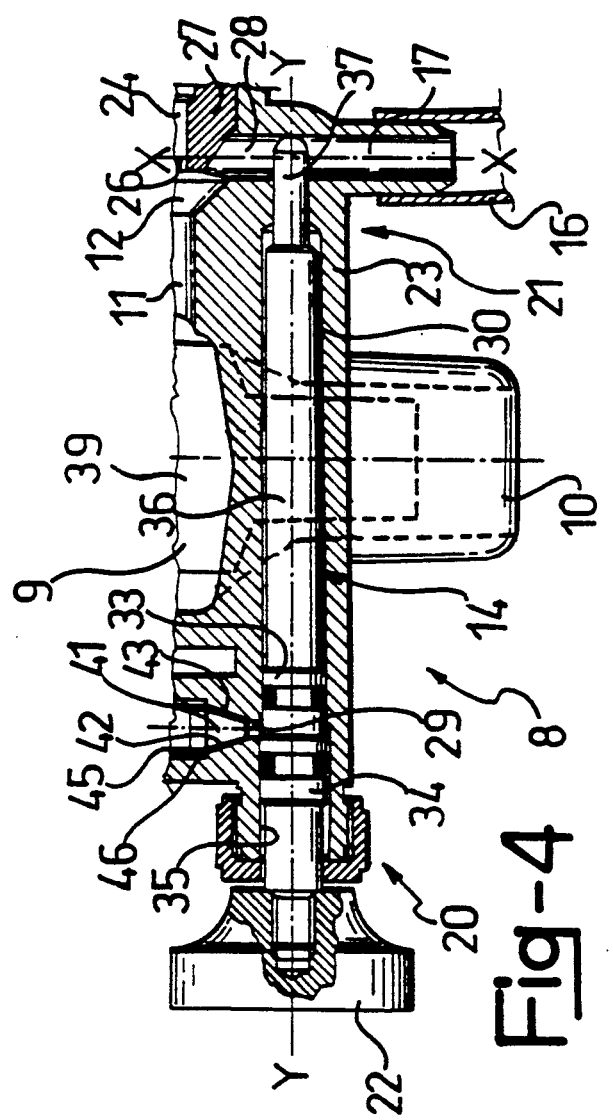

AUTOMATIC MACHINE FOR DISPENSING BLACK COFFEE, WHITE COFFEE, AND THE LIKE

TECHNICAL FIELD

This invention relates to an automatic machine for dispensing black coffee, white coffee, and the like, according to the preamble of the main claim.

BACKGROUND ART

As is known, such machines leave much to be desired as regards convenience of operation, where they are used for preparing "cappuccino" white coffee. In fact, they require the intervention of an operator in order to have emulsified milk added to the coffee previously delivered into a cup, and provide the desired "cappuccino" white coffee. This evidently involves a waste of time. EP-A-195750 discloses an emulsifier device for emulsifying steam and milk.

The problem that underlies this invention is to provide a machine as specified above, which has such structural and performance characteristics as to overcome the above-noted shortcoming.

DISCLOSURE OF INVENTION

This problem is solved by a machine according to the characterizing clause of the main claim.

BRIEF DESCRIPTION OF DRAWINGS

Further features and the advantages of a machine according to this invention will become more clearly apparent from the following detailed description of a preferred embodiment thereof, given by way of illustration and not of limitation with reference to the accompanying drawings, where:

FIG. 2 is an enlarged scale cross-sectional view of a detail of the machine shown in FIG. 1, taken along the line, FIG. 3 is a cross-sectional view of the detail in FIG. 2, taken along the line III—III, and FIG. 4 shows the same detail as in FIG. 2 but at a different operational stage thereof.

BEST MODE FOR CARRYING OUT THE INVENTION

Figure 1:
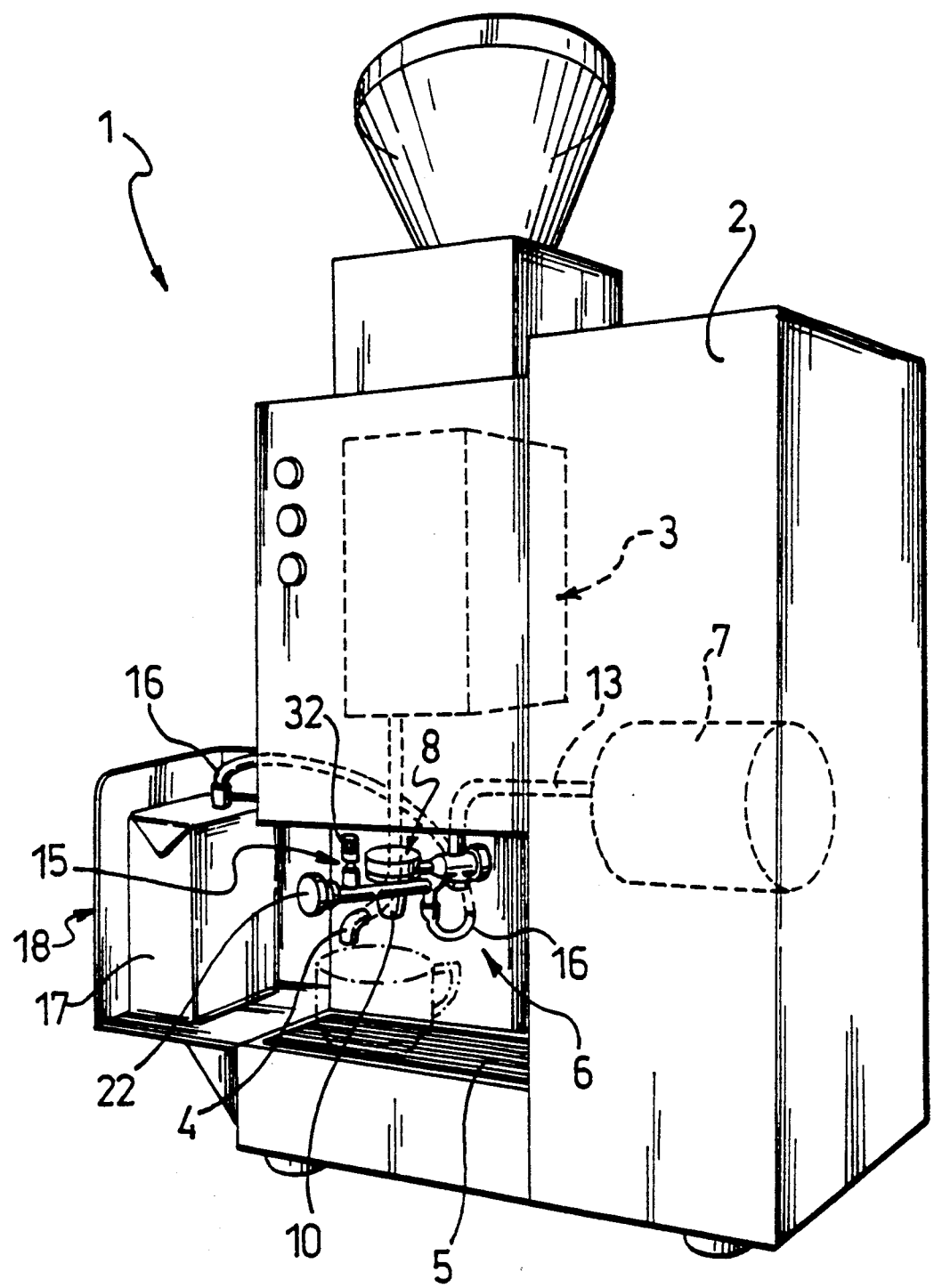
FIG. 1 is a perspective view of a machine according to the invention.

With reference to the drawing views, generally indicated at 1 is an automatic machine for dispensing black coffee, white coffee, and the like.

The machine 1 comprises, within a frame structure 2, a dispensing device 3 for dispensing coffee, which has a delivery spout 4 for delivering coffee, said spout 4 overhanging a supporting deck 5 on which a cup or the like can be laid.

The machine 1 also comprises, within the frame structure 2, a milk dispensing device 6.

The milk dispensing device 6 includes a steam generator 7 and an emulsifier device 8.

In the example shown, the emulsifier device 8 includes an emulsifying chamber 9 provided with a delivery spout 10 and being communicated with an intake chamber 12 via a conduit 11.

The intake chamber 12 is communicated, via a conduit 13, with the steam generator 7, and via a conduit 14 with an ambient air intake 15 and via a conduit 16 with a milk container 17, which may be a milk carton, housed within a bin 18 formed on the frame structure 2.

The emulsifier device 8 is supported on the frame structure 2 such that the delivery spout 10 is facing the aforesaid deck 5 substantially alongside delivery spout 4. In other words, the delivery spouts, 4 and 10, are mounted on the frame structure 2 in side-by-side relationship, thereby enabling them to deliver coffee and milk, respectively, into one cup placed on the deck 5.

A throttling member 19 is arranged in the air conduit 14 for controlling the flow rate of ambient air, the conduit being also provided with a shutter member 20 operable to cut off the air flow.

The milk conduit 16 has a throttling member 21 for reducing the flow rate of milk as required.

The shutter member 20 and throttling member 21 can be controlled manually by operation of a common control knob 22.

In a preferred embodiment, the emulsifier device 8 comprises a body 23 which is intended for attachment to the end of the steam conduit 13 cantilever-fashion.

The body 23 is formed with a steam supply passageway 24 which extends between an inlet port 25 connected to the steam conduit 13 and an outlet nozzle 26 wherethrough it opens into the intake chamber 12.

An end section of the steam supply passageway 24 runs through a diffuser 27 being a force fit in the body 23 and having gradually decreasing flow cross-section toward the outlet nozzle 26, which will function as an ejector nozzle.

The milk conduit 16 and air conduit 14 are led to the body 23 and open into the intake chamber 12.

In particular the milk intake conduit 16 has an end section 28 having an orientation axis X—X.

The air conduit 14 has a first section 29 which extends along a parallel direction to the axis X—X from the air intake 15, and a second section 30 which extends along a perpendicular direction Y—Y to the axis X—X and opens into the end section 28 of a milk conduit 17 (see FIG. 4), and hence into the intake chamber 12 itself.

More specifically, the second section 30 of the air conduit 14 opens into the end section 28 of the milk conduit 17 through a port 31 which has a selected square cross-sectional shape.

Located at the first section 29 of the air conduit 14 is the throttling member 19 for controlling the air flow rate, which is operable manually by means of a knurled head 32.

Located on the air conduit 14 between the first section 29 and the second section 30 is the shutter member 20. The shutter member 20 is embodied by a stopper 33 connected to a slider 34. The slider 34 fits in a movably guided fashion inside a seat 35 formed in the body 23 in continuation of the second section 30 of the conduit 17 where the first section 29 merges with the second section 30. The assembly formed by the slider 34 and the stopper 33 is shiftable manually under the action from the knob 22 which is attached to the slider 34 and accessible from outside between a first "in" position where the stopper 33 is operative in the second section 30 of the air conduit 14 to cut off the air flow, and a second "out" position where the stopper 33 is disengaged from said conduit section 30 and allows the flow of air therethrough.

The throttling member 21 is located in the end section 28 of the milk conduit 17 and is embodied by a cylindrical end bit 36 formed integrally with the stopper 33 as a coaxial extension thereof and lying along the second section 30 centrally thereof. The end bit 36 has a working end section 37 which has a circular cross-sectional shape and extends through the square cross-section port 31.

Thus, an interspace 38 is formed between the working section 37 and the port 31 to allow of unrestricted air flow.

In accord with the movements of the slider 34 and the stopper 33, the working section 37 of the end bit 36 will be shiftable between an operative position where the working section 37 projects cantilever-fashion inside the end section 28 of the milk conduit 17 and an inoperative position where said working section 37 is retracted inside the port 31.

It should be noted that with the working section 37 in its operative position where it projects cantilever-fashion inside the end section 28, it would throttle down the cross-section of the latter and hinder the flow of milk.

Formed in the body 23 is also the cylindrical emulsifying chamber 9, which is connected to the intake chamber 12 by the conduit 11 and communicated with the outside through the delivery spout 10.

The conduit 11 extends in line with the steam supply passageway 24 and opens into the emulsifying chamber 9 tangetially thereof. The delivery spout 10 locates at the center of the emulsifying chamber 9 and opens in the downward direction toward the deck 5.

Indicated at 39 is a sheet partition which extends transversely inside the emulsifying chamber 9 and projects from a lid 40 which is secured sealingly on the body 23 and delimits the emulsifying chamber 9 at the top.

It should be noted that the intake air throttling member 19, located in the first section 29 of the air conduit 14, comprises a pin element 41 with a conical shape which is mounted on the body 23 in a micrometrically shiftable manner toward and away from a seat 42 formed in the body 23, said seat 42 having a conical shape matching that of the pin element 41.

The pin element 41 and seat 42 jointly define, in the first section 29, a narrowed air flow cross-section 43 which can be adjusted as required.

In particular, the pin element 41 is formed integral with a tangent screw 44, in screw thread engagement with the body 23. The tangent screw 44 is, in turn, formed integral with the knurled head 32.

Advantageously, the first section 29 has a portion 45 communicated with the outside and the narrow cross-section 43, said portion being formed in a groove 46 cut along the tangent screw 44.

The operation of the machine 1 will be described herein below with reference to a starting condition whereby the shutter member 20 is in its open position and the throttling member 21 in its inoperative position.

With the machine 1 in operation, the coffee dispensing device 3 will deliver a given amount of espresso coffee from the spout 4 toward the deck 5 and into a cup.

Preferably simultaneously with that delivery of espresso coffee, the milk dispensing device 6 is also made to operate. More specifically, steam from the steam generator 7 will reach, through the conduit 13, the intake chamber 12 and draw thereinto by Venturi effect air and milk from their respective conduits, 14 and 15.

The air and milk thus drawn in are entrained through the conduit 11 from the intake chamber 12 into the emulsifying chamber 9, wherein they become emulsified together. At the same time, the steam will transfer its heat content to the milk thus emulsified with air, and heat it.

Under this heated and emulsified condition—or, in common terms, "worked up"—the milk is then delivered through the spout 10 into the cup on the deck 5.

Thus, the "cappuccino" white coffee sought is obtained with an optimum creamy consistency, by direct delivery of espresso coffee and heated and worked-up milk into the cup.

Should the consumer demand that non-emulsified milk be delivered, it is sufficient to operate the knob 22 to cut off the flow of air through the conduit 14 and slow down the flow of milk through the conduit 16.

Accordingly, milk will reach the intake chamber at a slower rate, and the adequately heated by the time it reaches the spout 10. By cutting off the flow of air, the milk can be delivered in a non-emulsified state.

By operating the knob 22 in the opposite direction, the machine will be restored to its initial condition ready to dispense "cappuccino" white coffee upon request.

A major advantage of the machine according to the invention is that it affords the ability to dispense "cappuccino" white coffee in a fully automated fashion.

A further advantage of the inventive machine is that it can deliver "cappuccino" white coffee of an uncommonly high quality, and in particular having optimum creamy consistency.

Note should also be taken of that the machine can operate at a very fast rate, since "cappuccino" white coffee can now be served by delivering espresso coffee and worked-up hot milk substantially simultaneously into one cup.

It is noteworthy, however, that this machine can also meet, where quick delivery is not a factor, specific demands to suit individual choices, as dictated occasionally by local habits and preferences, by dispensing on request the emulsified milk ahead of or after the delivery of espresso coffee, rather than simultaneously therewith.

Another advantage of the machine of this invention is that it is highly versatile in performance, since it can also deliver excess milk, even just warmed up and non-emulsified.

Understandably, the machine described in the foregoing may be altered and modified in various ways by a skilled person in the art to meet specific and contingent demands without by so doing departing from the scope of the invention as set forth in the appended claims.

I claim:

1. A machine (1) for selectively dispensing black and white coffee of the cappuccino type, comprising: a frame structure (2); a coffee dispensing device (3) in the frame structure, having a delivery spout (4); a milk dispensing device (6) in the frame structure, including an emulsifier device (8) and having a delivery spout (10); a steam generator connected to the emulsifier device; the delivery spout (4) of the coffee dispensing device (3) and the delivery spout (10) of the milk dispensing device (6) being close to each other for direct delivery into one cup; said emulsifier device including an air inlet for supplying air and a milk conduit for supplying milk for mixing with the air and steam to emulsify the milk in the emulsifier device and for discharge of the emulsified milk through the delivery spout of the milk dispensing device.

2. A machine according to claim 1, wherein the emulsifier device (8) comprises an intake chamber (12) connected to the steam generator (7), the air inlet and milk conduit being connected to the intake chamber and positioned so that when steam is received into the intake chamber, air and milk are entrained by the steam for mixing with the steam to form the emulsified milk.

3. A machine according to claim 2 wherein the emulsifier device comprises an emulsifying chamber (9) communicating with the intake chamber (12) for receiving the steam, air and milk and mixing the steam, air and milk to form the emulsified milk, the emulsifying chamber also communicating with the delivery spout (10) of the milk dispensing device (6) for dispensing the emulsified milk.

4. A machine according to claim 3, including an air conduit (14) connected between the air inlet and the intake chamber, a shutter member (20) mounted for movement in the air conduit for closing off communication between the air inlet and the air conduit to block a passage of air to the intake chamber, and a throttle member (21) movably mounted to the emulsifier device for blocking the milk conduit to stop a flow of milk from the milk conduit into the intake chamber.

5. A machine according to claim 4 wherein the shutter member and throttle member are connected to each other, and to a common control knob (22) for movement of the shutter member and throttle member together when the control knob is moved.

6. A machine for dispensing coffee with and without milk which is pre-heated or emulsified, comprising:
   a housing defining an enclosure and a frame for the machine;
   a deck connected to the housing and being outside of the enclosure for supporting a cup for receiving coffee;
   a coffee dispensing device within the enclosure having a coffee delivery spout extending out of the enclosure and positioned above the deck;
   a steam generator in the enclosure, the steam generator having a steam supply conduit extending to a location above the deck;
   means for supporting a milk container adjacent the housing;
   a milk conduit extending from the means for supporting the milk container and to a location above the deck;
   a milk dispensing device containing a milk emulsifier and an air inlet, connected in cantilever fashion to the housing and extending above the deck, the milk dispensing device being connected to the milk conduit and to the steam supply conduit for supplying milk and steam to the emulsifier for being mixed with air from the air inlet to produce emulsified milk; and
   a milk delivery spout connected to the milk emulsifier and positioned above the deck and immediately adjacent the coffee delivery spout for supporting both coffee and milk to a cup supported on the deck.

7. A machine according to claim 6, including a shutter member movably mounted in the emulsifier and operable to admit and block air into the emulsifier through the air inlet for selectively producing emulsified and non-emulsified milk to be dispensed through the milk delivery spout.

* * * * *